(12) United States Patent
Falzon

(10) Patent No.: US 6,254,186 B1
(45) Date of Patent: Jul. 3, 2001

(54) ADJUSTABLE LUMBAR SUPPORT

(75) Inventor: Mark Falzon, Leamington Spa (GB)

(73) Assignee: Henderson's Industries Pty Ltd (*) Notice: Subject to any disclaimer, the term of this patent is extended or adjusted under 35 U.S.C. 154(b) by 0 days.

(21) Appl. No.: 09/254,088

(22) PCT Filed: Jul. 30, 1997

(86) PCT No.: PCT/AU97/00480
§ 371 Date: Mar. 1, 1999
§ 102(e) Date: Mar. 1, 1999

(87) PCT Pub. No.: WO98/09835
PCT Pub. Date: Mar. 12, 1998

(30) Foreign Application Priority Data

Sep. 5, 1996 (AU) .................................................. PO 2134

(51) Int. Cl.$^7$ .............................. A47C 3/027; A47C 7/46
(52) U.S. Cl. ..................... 297/284; 297/284.1; 297/284.2
(58) Field of Search ............................ 297/284.4, 284.8, 297/284.1, 284.2, 284.3

(56) References Cited

U.S. PATENT DOCUMENTS

| | | | |
|---|---|---|---|
| 3,241,879 | 3/1966 | Castello et al. ................... | 297/284.4 |
| 3,258,259 | 6/1966 | Bohlin .......................... | 297/284.4 X |
| 3,492,031 | 1/1970 | Henning . | |
| 3,948,558 | 4/1976 | Obermeier et al. ................ | 297/284.4 |
| 4,155,592 | 5/1979 | Tsuda e al. ...................... | 297/284.4 |
| 4,354,709 | 10/1982 | Schuster ....................... | 297/284.4 X |
| 4,452,485 | 6/1984 | Schuster ......................... | 297/284.4 |
| 4,462,635 | 7/1984 | Lance ............................ | 297/284.2 X |
| 4,531,779 | 7/1985 | Hashimoto ....................... | 297/284.4 |
| 4,565,406 | 1/1986 | Suzuki ........................... | 297/284.4 |
| 4,840,425 | 6/1989 | Noble ............................ | 297/284.1 |
| 4,858,992 | 8/1989 | LaSota ........................... | 297/284.2 |
| 4,895,041 | 1/1990 | Cunningham . | |
| 5,217,278 | 6/1993 | Harrison et al. ............... | 297/284.4 X |
| 5,224,757 | 7/1993 | Geitz et al. ..................... | 297/284.4 |
| 5,261,293 | 11/1993 | Kelley . | |
| 5,462,335 | 10/1995 | Seyler ............................ | 297/284.4 X |
| 5,507,559 | 4/1996 | Lance ............................. | 297/284.4 X |
| 5,553,919 | 9/1996 | Dennis ............................ | 297/284.4 |
| 5,685,606 | * 11/1997 | Lance ............................ | 297/284.4 |
| 5,716,098 | 2/1998 | Lance ............................. | 297/284.4 |
| 5,769,490 | 6/1998 | Falzon ........................... | 297/284.4 |
| 5,788,328 | 8/1998 | Lance ............................ | 297/284.4 |
| 5,797,652 | * 8/1998 | Darbyshire ....................... | 297/284.4 |

FOREIGN PATENT DOCUMENTS

| | | |
|---|---|---|
| 78335/97 | 3/1988 | (AU) . |
| 72609/87 | 6/1989 | (AU) . |
| 51455/93 | 5/1996 | (AU) . |
| 2003661 | 8/1971 | (DE) ................................ 297/284.2 |
| 3817977A1 | 11/1989 | (DE) . |
| 0518830A1 | 12/1992 | (EP) . |

(List continued on next page.)

Primary Examiner—Peter M. Cuomo
Assistant Examiner—Rodney B. White
(74) Attorney, Agent, or Firm—Birch, Stewart, Kolasch & Birch, LLP

(57) ABSTRACT

An adjustable lumbar support for the backrest of a seat, including an elongate flexible band having first and second ends attachable to sides of a backrest. A drive member is connected to the band so as to tension the band and so decrease the extent to which the band curves rearwardly with respect to the ends thereof. The band includes a plurality of pleats, extending transverse to the length of the band and arranged to expand or collapse in response to changes in the longitudinal tension in the band. As shown, the pleats form part of a shield overlying a tensionable strap. In another arrangement (not shown) the pleats are disposed between and interconnect adjacent relatively rigid rib-like elements. The drive may include a motor driving a screw-threaded spindle arranged at right angles thereto and connected to the band so that the spindle extends in the longitudinal direction of the band. A carriage responds to rotation of the spindle so as to tension the band.

31 Claims, 13 Drawing Sheets

FOREIGN PATENT DOCUMENTS

| | | | |
|---|---|---|---|
| 0540481A1 | 5/1993 | (EP) . | |
| 0296938 | 12/1998 | (EP) . | |
| 360516 | 11/1931 | (GB) . | |
| 1077189 | 7/1967 | (GB) | 297/284.4 |
| 2045076A | 10/1980 | (GB) | 297/284.2 |
| WO89/09005 | 10/1989 | (WO) . | |
| WO92/17096 | 10/1992 | (WO) . | |
| WO93/05683 | 4/1993 | (WO) . | |
| WO94/08492 | 4/1994 | (WO) | 297/284.4 |
| 94/24904 | 11/1994 | (WO) . | |
| 95/17840 | 7/1995 | (WO) . | |

* cited by examiner

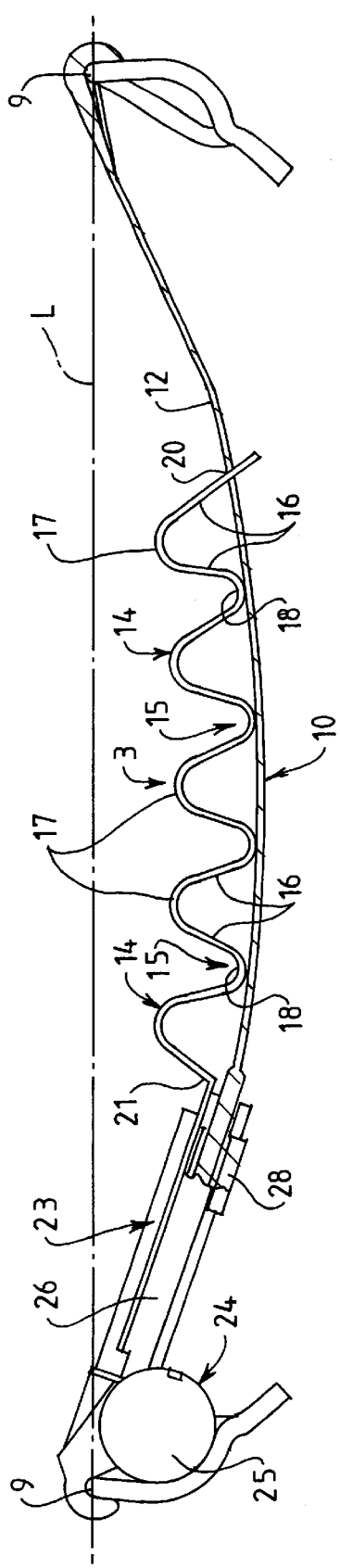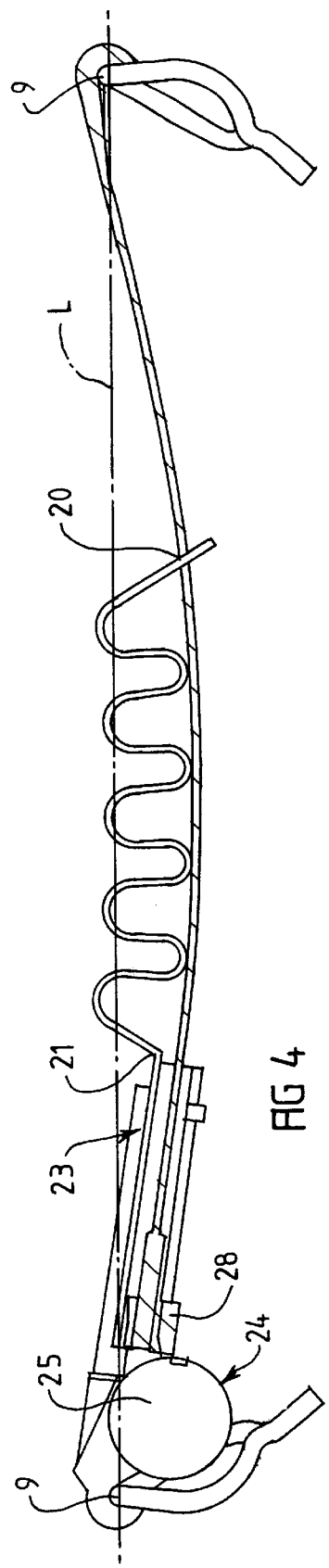

ADJUSTABLE LUMBAR SUPPORT

This application is the national phase under 35 U.S.C. §371 of prior PCT International Application No. PCT/AU97/00480 which has an International filing date of Jul. 30, 1997 which designated the United States of America.

This invention relates to lumbar supports for use in the backrest of seats, chairs and the like. The invention is especially suited for use with vehicle seats, and it will be convenient to hereinafter describe the invention with particular reference to that example use. In that regard, the word "vehicle" is to be understood as embracing vehicles of all kinds including aircraft, waterborne vehicles and land vehicles.

It is well known to provide adjustable lumbar supports in vehicle seats, and especially in the seat to be occupied by the vehicle driver. Such adjustable supports take a variety of forms, and the manner of achieving adjustment also varies widely. The adjustment is generally such that it varies the effective length of the support and/or its stiffness, and thereby influences the extent to which the support curves rearwards in response to pressure applied by the user of the vehicle seat. That is, the support may provide a relatively flat or a deeply curved support for the vehicle seat occupant, according to the level of adjustment of the effective length of the support.

Adjustment of the foregoing kind is sometimes referred to as fore and aft adjustment, which reflects the direction in which the central part of the support moves during adjustment under normal use conditions.

Adjustment of the effective length of the lumbar support requires drive means, which may be power driven (e.g., electric) or manually driven. In either case, an actuator is required and that is generally mounted on the seat frame or other support structure, and is connected to the lumbar support through a suitable drive connection. Separate mounting of the actuator and the lumbar support adds to the inconvenience and cost of installing the lumbar support assembly.

Another problem encountered with lumbar supports as are currently available, is the need to impose relatively high forces in order to adjust the lumbar support from a deeply curved condition towards a relatively flat condition. The magnitude of the force required increases as the lumbar support flattens.

It is an object of the present invention to provide an improved lumbar support assembly in which at least part of the drive means for causing adjustment of the lumbar support is mounted on the lumbar support prior to attachment of that support to a seat frame. It is a further object of the invention to provide an improved lumbar support which minimises the forces necessary to adjust the support towards a relatively flat condition.

According to one aspect of the present invention, there is provided a lumbar support for use with the backrest of a seat, said support including, an elongate band having a first end and a second end and a front load bearing surface located between said ends, each said end being connectable to a respective one of two sides of said backrest between which the band extends when in use, drive means connected to said band and being operable to vary the longitudinal tension in the band, said load bearing surface having a rearward curvature between said ends at least when said tension is relatively low, and a plurality of pleats located between said first and second ends, each said pleat forming part of said band and being responsive to said variation in tension so as to fold or unfold and thereby vary said rearward curvature.

In one form, the band includes a strap member which in use extends between two spaced sides of the backrest, and a shield member which overlies at least part of a front surface of the strap member and which extends forwardly from that surface by a variable distance. The two members interact so that the aforementioned distance increases in response to movement of the strap member towards a tensioned condition and decreases in response to movement of the strap member towards a relaxed condition.

The reference to "strap member" in the preceding and following passages of this specification is to be understood as embracing any elongate member having a degree of flexibility such that it can be bent or straightened as required. The strap member may comprise a single strap or the like, or it may comprise a plurality of straps or the like arranged side by side. Furthermore, the reference to "relatively flat" is to be understood as embracing situations in which the strap member is not completely flat or straight between its ends, but has a degree of rearward curvature which is shallow by comparison with the rearward curvature adopted in the relaxed condition of the strap member.

In a preferred arrangement the shield member includes or is composed of a concertina-like section having a plurality of pleats or folds each of which extends generally transverse to the longitudinal axis of the strap member. The crest of each pleat or fold can be relatively sharp or blunt according to requirements, and the outer surface of each crest can be Telatively flat or curved as required, in either the longitudinal direction of the crest or a direction transverse thereto. For convenience of description each pleat having its crest located forwardly of the front surface of the strap member will be referred to as a rib, and each intervening pleat will be referred to as a valley: The base of each valley may have a transverse cross-sectional shape corresponding to that of the crest of each rib, but that is not essential.

The concertina-like section is preferably arranged so that the base of at least some of the valleys are supported directly or indirectly by the front surface of the strap member. It will be apparent that the crest of each rib is spaced forwardly and outwardly from that front surface. The arrangement is such that variation in the longitudinal extent of the concertina-like section causes a variation in the depth of that section, which is the distance between two planes one of which contains the crests of the ribs and the other of which contains the bases of the valleys.

When a lumbar support of the foregoing kind is installed for use the ribs and the valleys of the concertina-like section extend in a direction which is generally consistent with the direction in which the associated seat backrest extends upwardly from the seat base. The arrangement is such that the depth of the concertina-like section increases in response to increased tension in the strap member and as a result two mechanisms combine to produce a firmer support for the back of a person occupying the associated seat. One mechanism is the flattening or straightening of the strap member, and the other is the increase in front to back depth of the concertina-like section.

In a variation of the lumbar support described above the band does not involve separate strap and shield members as described, but includes a plurality of relatively rigid elements which are spaced apart in the longitudinal direction of the band, and at least one pleat is located between and interconnects each two adjacent elements. The pleats respond to changes in longitudinal tension in the band by expanding or collapsing laterally and thereby changing the lateral spacing between adjacent elements. Such a change in spacing causes a change in the effective length of the band and thereby alters the rearward curvature of the band.

A lumbar support according to the invention can be adjusted by any appropriate drive means. In one arrangement the drive means is electrically operated and is combined with the lumbar support band to form an assembly which can be attached to and removed from the backrest of a seat as a single unit.

The drive means may include a screw threaded spindle and nut system which is operative to adjust the longitudinal tension in the lumbar support band and thereby adjust the depth of rearward curvature of that band. An electric motor may be operatively connected to the screw threaded spindle through a worm and worm wheel connection. A particularly compact drive means is achieved by arranging the motor to extend in a direction transverse to the longitudinal axis of the screw threaded spindle.

According to another aspect of the invention, there is provided a lumbar support for use with the backrest of a seat, said support including an elongate flexible band having a first end and a second end, mounting means at each said end operable to connect the respective said end to a respective one of two sides of said backrest between which the band extends when in use, a front load bearing surface of said band located between said ends, drive means connected to said band and being operable to vary the longitudinal tension in said band, said drive means having an electric motor attached to said first end and a screw threaded spindle drivably connected to said motor so as to rotate in response to operation of the motor, said spindle having its rotational axis extending generally in the longitudinal direction of said band and substantially at right angles to the axis of said motor, said motor being arranged so that the axis thereof extends generally in the same direction as the said backrest side to which said first end is connected when the lumbar support is in use, and means connecting said spindle to said band end so that said longitudinal tension changes in response to said spindle rotation.

In accordance with still another aspect of the invention, there is provided a lumbar support for use with the backrest of a seat, said support including, an elongate band having a first end and a second end and a front load bearing surface located between said ends, each said end being connectable to a respective one of two sides of said backrest between which the band extends when in use, a strap member forming part of said band extending between said first and second ends, a shield member forming part of said band overlying at least part of a front surface of said strap member, at least part of said shield member including a plurality of ribs which are spaced apart in the longitudinal direction of said band and each of which extends transverse to said longitudinal axis, drive means connected to said band and being operable to vary the longitudinal tension in the band, said load bearing surface having a rearward curvature between said ends at least when said tension is relatively low, and said strap member is responsive to said variation in tension to move relative to said shield member in the longitudinal direction of said band and thereby vary said rearward curvature.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

BRIEF DESCRIPTION OF THE DRAWINGS

In the drawings:

FIG. 3 is a semi-diagrammatic plan view of another embodiment of the invention.

FIG. 4 is a view similar to FIG. 3 but showing the lumbar support in more highly tensioned condition.

DETAILED DESCRIPTION OF THE PREFERRED EMBODIMENT

Figure 1:
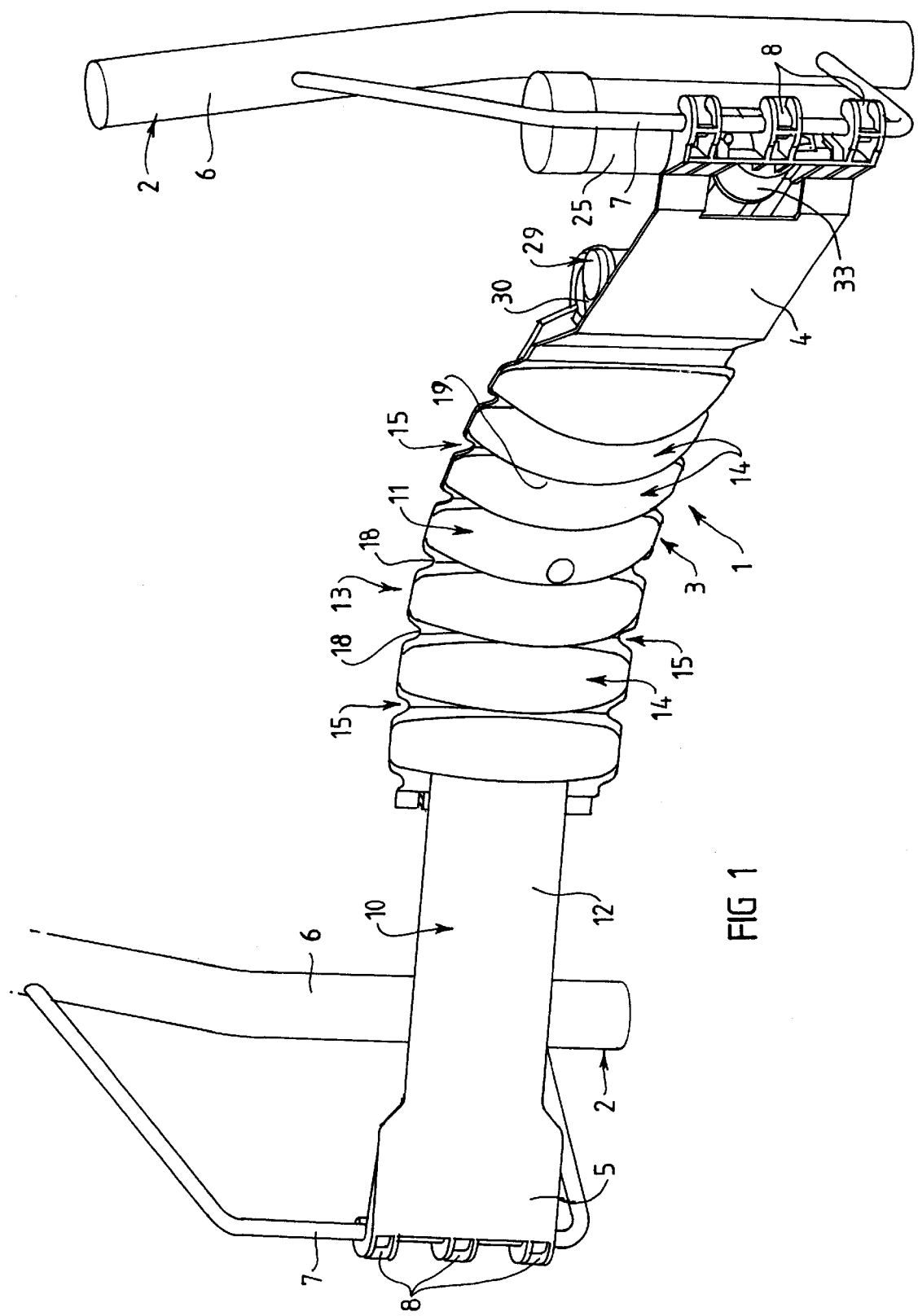
FIG. 1 is a perspective view of a lumbar support according to one embodiment the invention and shows the lumbar support connected to the frame seat backrest.
Figure 2:
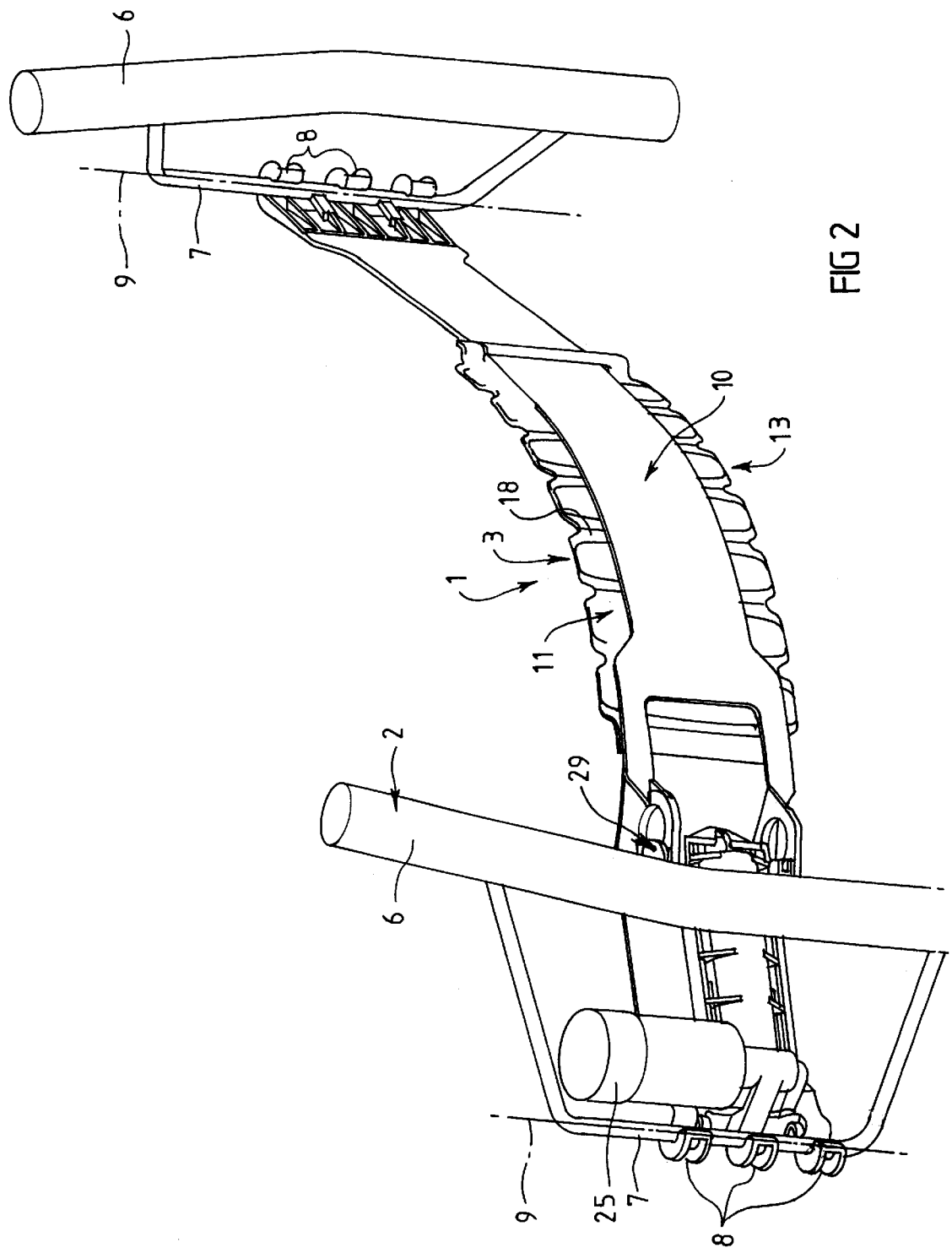
FIG. 2 is a view similar to FIG. 1 but showing the reverse side of the lumbar support.

FIGS. 1 and 2 show a lumbar support assembly 1 incorporating one embodiment of the invention connected to the frame 2 of the backrest of a seat. The assembly 1 includes a lumbar support band 3 having end portions 4 and 5, each of which is attached to a respective side member 6 of the backrest frame 2. It is preferred that the attachment enables pivotal movement of each end portion 4 and 5 relative to the respective frame member 6, and FIGS. 1 and 2 show an example arrangement for achieving that result. Any suitable mounting means could be adopted for the purpose of connecting the ends of the support band 3 to the backrest frame 2, but a releasable connection is preferred.

In the arrangement shown, a mounting bar 7 is secured to each of the frame members 6 so as to be located forwardly of that member and arranged substantially parallel to the front surface of the seat backrest (not shown). Each of the band end portions 4 and 5 is clipped on to a respective one of the bars 7 by means of hook-like fingers 8 or other suitable attaching means so as to permit relative rotation about the axis 9 of the respective bar 7 (FIG. 2). It will be appreciated that other arrangements could be adopted for achieving substantially the same result.

The band 3 includes two principal components, a strap member 10 and a shield 11. The strap member 10 in the arrangement shown is an elongate flexible member which is of substantially rectangular shape in transverse cross-section. The member 10 and the shield 11 can each be made of any suitable material such as a plastics material selected to suit the particular function of the respective component. Although the member 10 is shown as being formed of a single piece it can be formed of a plurality of pieces. For example, it could be formed of a plurality of separately formed straps or the like arranged side by side. Also, a single piece strap as shown could have one or more apertures formed therethrough to reduce weight and/or increase flexibility, and any such aperture could be a slot extending generally in the longitudinal direction of the strap. An aperture or apertures of the foregoing kind could also be used with one or more straps of a multi-strap arrangement.

A front surface 12 of the strap member 10 faces towards the front surface of the associated seat backrest (not shown). The shield 11 is disposed over at least a portion of that front surface 12 so as to intervene between the surface 12 and the padding of the backrest. Adjustment of the lumbar support is achieved by varying the longitudinal tension in the strap member 10 and that involves longitudinal movement of the strap member 10 relative to the backrest padding. The presence of the shield 11 minimizes the resistance to that movement and also minimizes the tendency for the padding to follow that movement and produce uncomfortable "bunching" of the padding towards one side of the backrest. In the arrangement shown by FIGS. 3 and 4, the shield 11 has a further function which is to reduce the effort required to move the lumbar support band 3 from the relaxed condition (FIG. 3) to the tensioned condition (FIG. 4).

The shield 11 includes a profiled section 13 which is composed of a plurality of hollow elongate members, each of which extends transverse to the longitudinal direction of the band 3. The elongate members are arranged side by side so that the section 13 is essentially composed of a plurality of ribs 14 and intervening valleys 15. In the particular arrangement shown the ribs 14 have substantially flat sides 16 and a curved crest 17 when viewed in transverse cross-section. Each two adjacent ribs 14 are interconnected through a web 18 or other suitable connection. It is to be understood, that the cross-sectional shape of the ribs 14 and the valleys 15 could be different to that shown. Still further, the cross-sectional shape need not be consistent through the complete series of ribs 14, or through the complete series of valleys 15.

Figure 5:
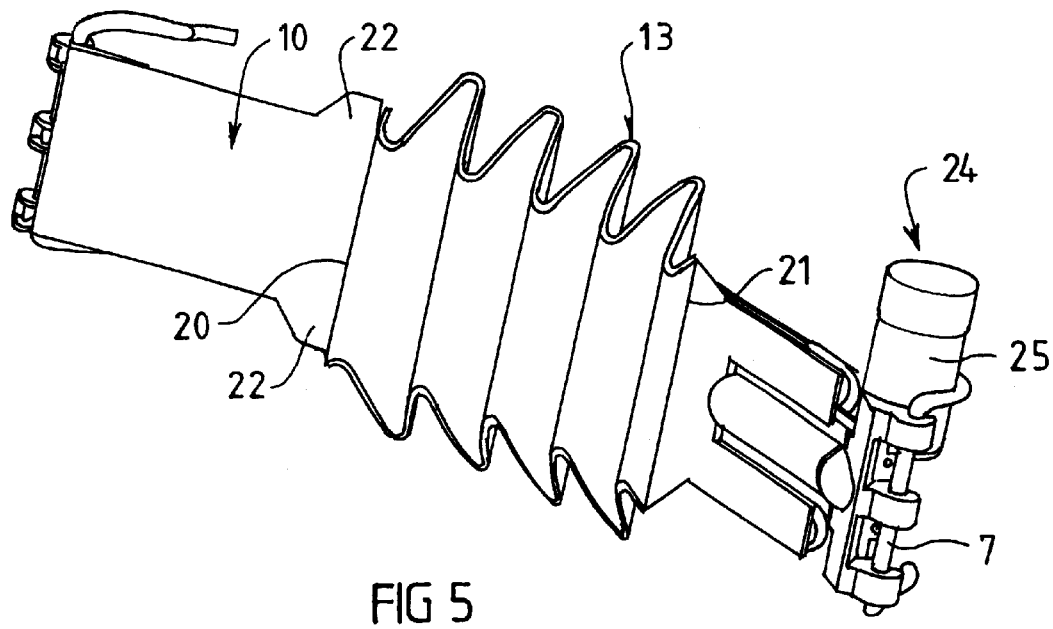
FIG. 5 is a perspective view of a lumbar support of the kind illustrated by FIGS. 3 and 4.
Figure 6:
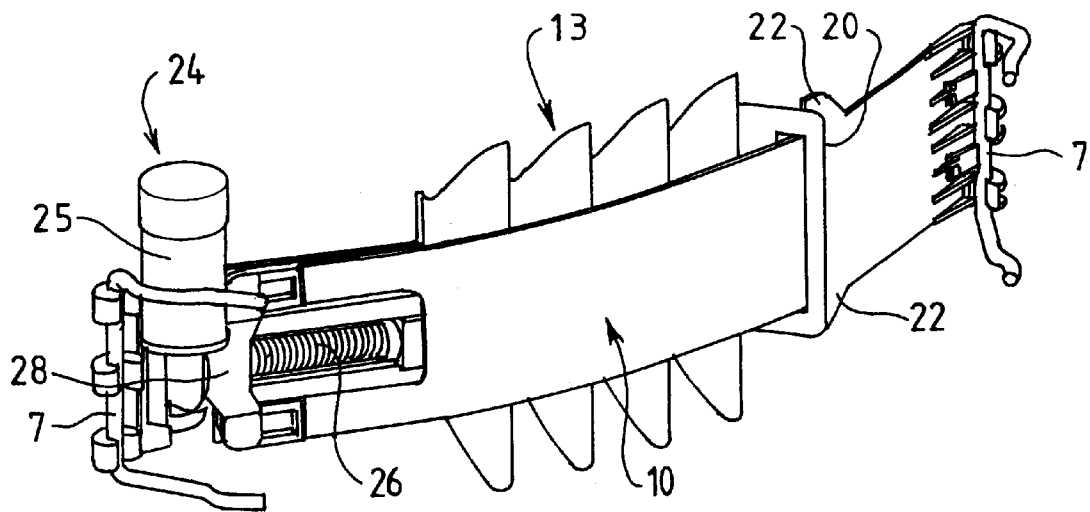
FIG. 6 is a view similar to FIG. 5 but showing the reverse side of the lumbar support.

As shown in FIGS. 1 and 2 the crest surface 19 (FIG. 1) of each rib 14 may be curved in the longitudinal direction of the rib 14 so that the maximum projection from the strap member front surface 12 is substantially at the longitudinal center of the rib 14. Alternatively, the crest surface 19 may be substantially parallel to the front surface 12 as shown by FIGS. 5 and 6.

It is preferred, as shown, that the section 13 extends over part only of the longitudinal extent of the band 3 and is positioned substantially central between the two frame members 6. It is also preferred that the section 13 maintains that substantially central disposition through all stages of adjustment of the band 3, and that may be achieved in a manner hereinafter described.

FIGS. 3 and 4 are concerned with a variation of the arrangement shown by FIGS. 1 and 2 in which the section 13 is of concertina-like form such that it is capable of collapse and extension in the longitudinal direction of the band 3. The section 13 is composed of a plurality of pleats or folds arranged to form a series of ribs 14 with intervening valleys 15. Each rib 14 preferably has flat sides 16 and a curved crest 17 when viewed in transverse cross-section, and the base 18 of each valley 15 is also preferably curved, as shown by FIG. 3. Other cross-sectional shapes could be adopted. The crest surface 19 of each rib 14 may be curved lengthwise as shown by FIG. 1, but that is not essential.

Adjustment of the support band 3 between the conditions shown by FIGS. 3 and 4 respectively is achieved by increasing or decreasing the longitudinal tension in the strap member 10 and thereby varying the effective length of the band 3. The effective length of the band 3 is the longitudinal length extending between the two supports 6 and measured, for example, along the curve of the strap member 10. As clearly represented by FIGS. 3 and 4, the effective length is greater in the relaxed condition than in the tensioned condition.

The shield section 13 may be arranged in any suitable manner so that the distance between the ends 20 and 21 of the section 13 reduces simultaneous with a reduction in the effective length of the band 3. That may be achieved by arranging the shield section 13 so that it responds to changes in the effective length of the band 3 as hereinafter described. Because of the pleated or folded nature of the section 13 a reduction in the space in between the ends 20 and 21 causes both the ribs 14 and the valleys 15 to be compressed laterally and that in turn causes an increase in the distance between the crest 17 of each rib 14 and to the base 18 of the adjacent valley 15. That distance will be hereinafter referred to as the rib depth.

Each of the ribs 14 of the shield section 13 may have substantially the same depth, and such an arrangement is shown by the accompanying drawings, but that is not essential. The section 13 could include ribs 14 of different depths. By way of example, ribs 14 of smaller depth might be provided at the ends of the section 13, and it may be that at least some of the ribs 14 on each side of the longitudinal center of the section 13 progressively increase in depth towards that center.

As best shown by FIGS. 5 and 6, the end 20 of the section 13 abuts against shoulders 22 which project laterally from the sides of the strap member 10. Because of that abutment the end 20 is forced to follow any shift in the position of the shoulders 22 relative to the frame members 6. The other end 21 of the section 13 is connected to a housing part 23 (FIG. 4) of the drive means 24 in such a way that the end 21 is fixed against movement towards or away from the adjacent frame member 6. The shield 11 thereby interacts with the strap member 10 and a relatively fixed support (the housing part 23) in such a way that it responds to changes in the degree of flatness of curvature of the strap member 10 so as to cause a change in the space in between the ends 20 and 21 of the section 13. It will be appreciated that other arrangements could be adopted to cause that change.

FIGS. 3 and 4 illustrate the benefit of combining longitudinal compression of the shield section 13 with straightening or flattening of the strap member 10. The line L shown in both FIGS. 3 and 4 is a straight line joining the axes of the two pivots 9. In the relaxed condition of the support band 3 as shown by FIG. 3 the crests 17 of the ribs 14 are some distance below the line 25. When the band is tensioned as shown by FIG. 4 the crests 17 protrude above the line L. In the absence of the concertina-like section 13 the front surface 12 of the strap member 10 would provide the support surface for an occupant of the associated seat, and as is evident from FIG. 4 the central portion of the surface 12 remains a significant distance below the line L. Substantial force would be required to tension the strap member 10 to the extent that it approached the relatively flat support provided by the shield section 13.

In each of the arrangements shown by FIGS. 1 to 6, the front surfaces 19 of the ribs or pleats of the shield 11 combine to form the load bearing surface of the band 3.

Any suitable drive means can be employed to effect fore and aft adjustment of the support band 3. That drive means could be power operated or manually operated. In the arrangements shown by FIGS. 1 to 6, the drive means 24 is connected to the band 3 to provide lumbar support assembly which can be conveniently attached to and removed from a seat frame 2.

Figure 7:
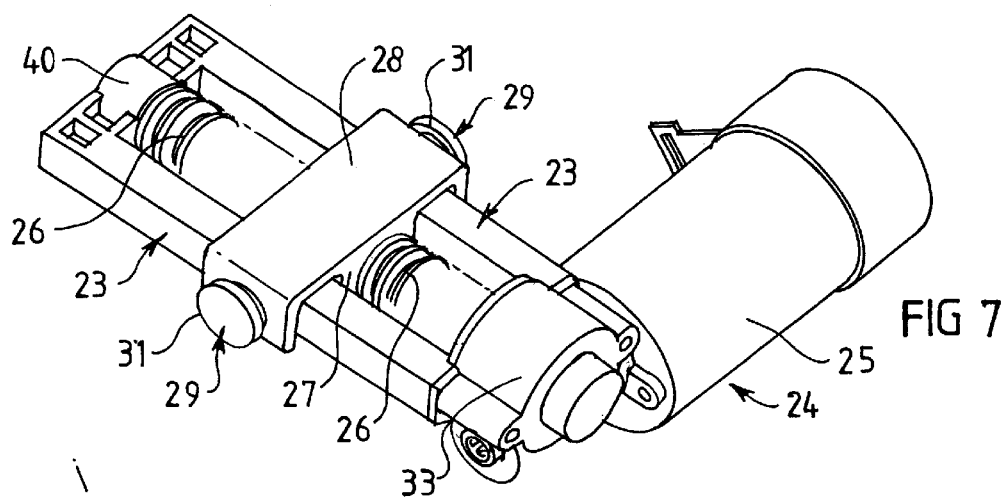
FIG. 7 is a perspective view of one form of drive means for a lumbar support according to the invention.
Figure 8:
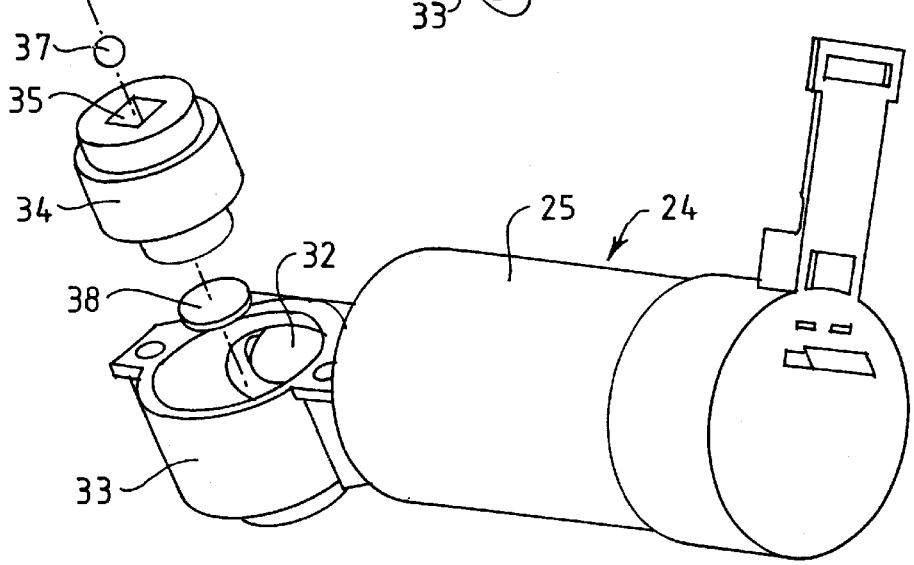
FIG. 8 is a perspective exploded view of part of the drive means of FIG. 7.
Figure 9:
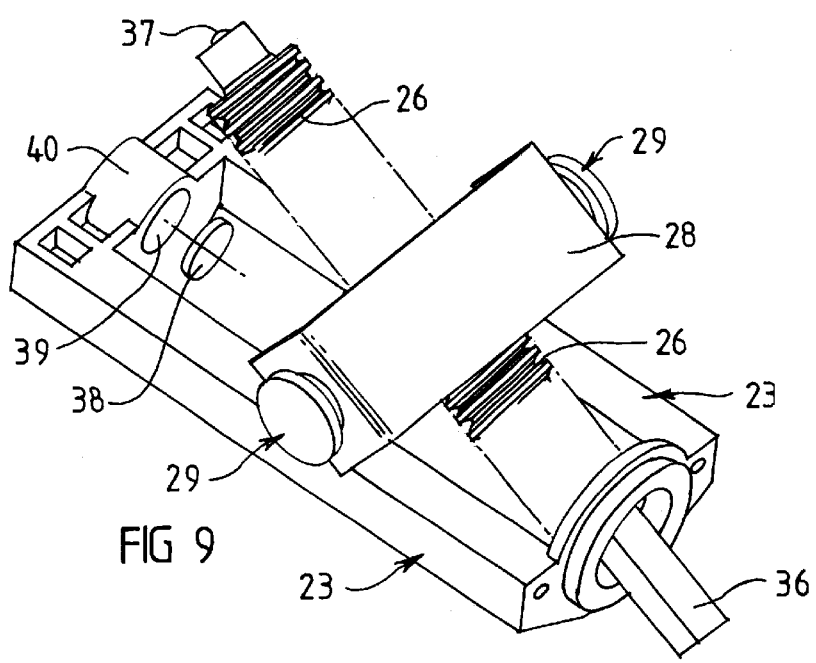
FIG. 9 is a perspective exploded view of another part of the drive means of FIG. 7.

One form of drive means 24 is shown by FIGS. 7 to 9 and includes an electric motor 25 drivably connected to a screw threaded spindle 26 in a manner such that the motor 25 and the spindle 26 extend substantially at right angles to one another. That arrangement permits the drive means 24 to occupy minimum space within a seat backrest and in particular minimize the intrusion of the drive means 24 into the area occupied by the padding of the backrest.

The spindle 26 is rotatably mounted in the housing part 23 so as to be retained against relative axial movement, and a complementary threaded nut 27 is arranged in threaded engagement with the spindle 26. The nut 27 forms part of or is connected to a carriage 28 which is slidably mounted on the housing part 23 and which is connectable to an end portion of the strap member 10 in any suitable fashion. The nut 27 is restrained against rotation with the spindle 26 and as a consequence rotation of the spindle 26 causes the carriage 28 to move along the spindle 26 in the axial direction thereof. The motor 25 is reversible so as to permit the carriage 28 to be moved in one direction or another, and that movement is employed to effect fore and aft adjustment of the support band 3 as illustrated by FIGS. 3 and 4. As previously described, in the arrangement according to FIGS. 3 to 6 such adjustment causes a variation in the depth of the ribs 14.

In the particular arrangement shown by FIGS. 1 and 2, the support band 3 is connected to each of two cylindrical trunnions 29 which project laterally from the respective opposite sides of the carriage 28 as best seen in FIG. 7. For the purpose of that connection a pair of apertured flanges 30 is provided at an end portion of the strap member 10, and each is adapted to fit over a respective one of the trunnions 29 as best seen in FIG. 2. Each trunnion 29 has an enlarged head 31 which functions to resist separation of the flanges 30 from the trunnions 29. The arrangement is such that each of the flanges 30 is able to pivot to a limited extent about the axis of the respective trunnion 29.

A different arrangement is adopted in the lumbar support shown by FIGS. 5 and 6. In that arrangement the trunnions 29 project forwardly from the carriage 28 rather than laterally as in the arrangement of FIGS. 1 and 2. The strap member 10 has an apertured end portion which co-operates with the trunnions 29 in a manner similar to that occurring with the arrangement of FIGS. 1 and 2. It will be apparent that other arrangements could be adopted for connecting the drive means 24 to the support band 3.

It is preferred that the motor 25 is connected to the spindle 26 through a worm and worm wheel drive. As shown diagrammatically by FIG. 8 a worm 32 may be connected to the output shaft (not shown) of the motor 25 and located within a gear box housing 33 so as to co-operably engage with a worm wheel 34 also located within the housing 33 and mounted for rotation about an axis extending transverse of the rotational axis of the worm 32. The worm wheel 34 has a square or other non-circular bore 35 which receives a correspondingly shaped end portion 36 (FIG. 9) of the spindle 26 to enable the spindle 26 to rotate in response to rotation of the worm wheel 34.

A relatively simple bearing arrangement may be adopted at each end of the spindle 26 as shown by FIGS. 8 and 9. A ball 37 of suitable material and hardness is engaged within a cavity of suitable shape at each end of the spindle 26, and each ball 37 bears against a respective bearing plate 38 formed of steel or other suitable material. One plate 38 is located within the base of the worm wheel bore 35 and the other is located at the base of a bore 39 in an end portion 40 of the housing part 23. Furthermore, the particular arrangements described involve adjustment at one end only of the support band 3. It is to be understood that the invention is applicable to arrangements in which adjustment occurs at both ends, possibly through the use of two separate drive means.

It is to be understood that the detail of the drive means 24 may differ from that described, and that drive means of an entirely different type could be adopted. By way of example, manually operable drive means could be used with a lumbar support according to the invention.

Figure 10:
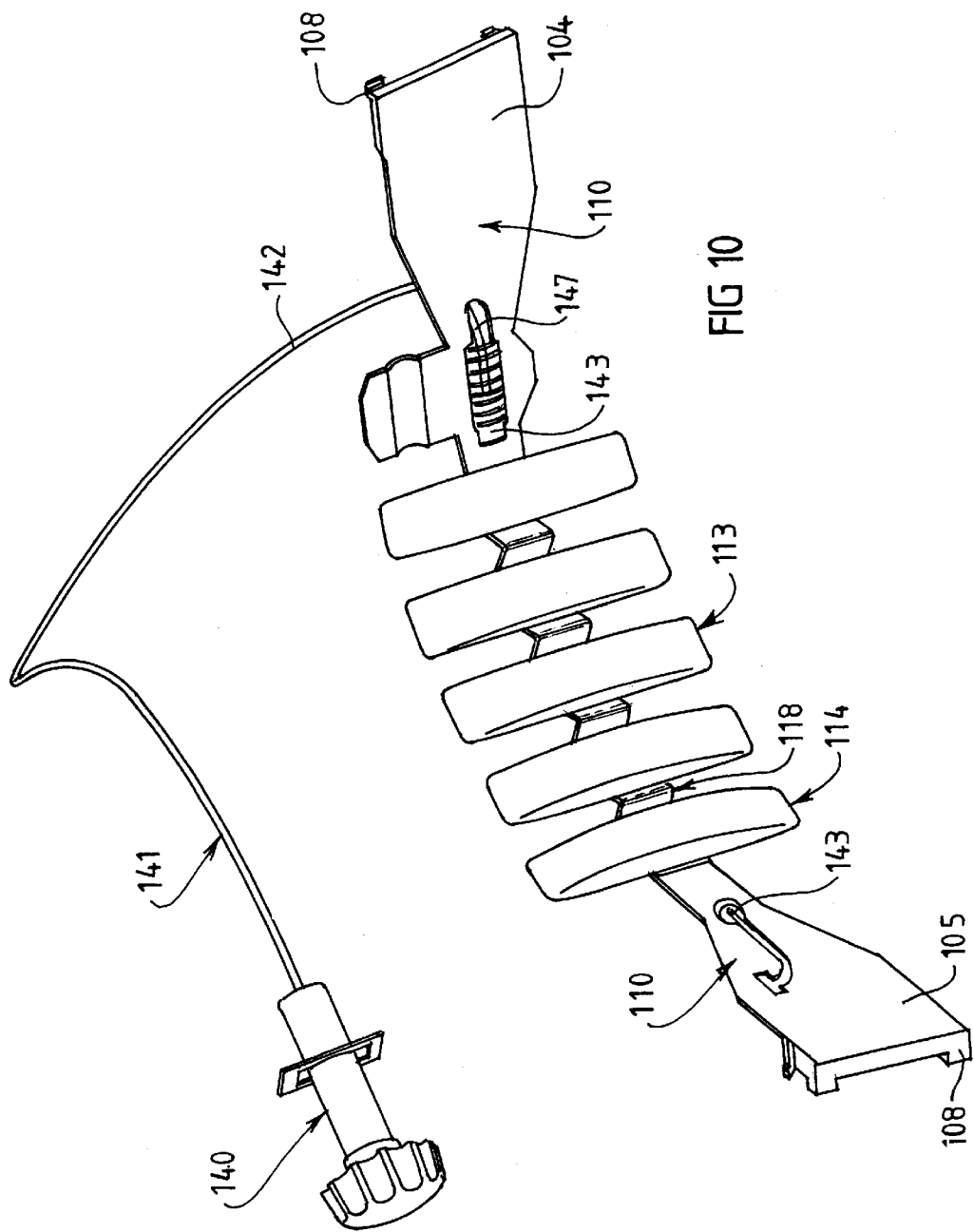
FIG. 10 is a front perspective view of another embodiment of the invention.
Figure 11:
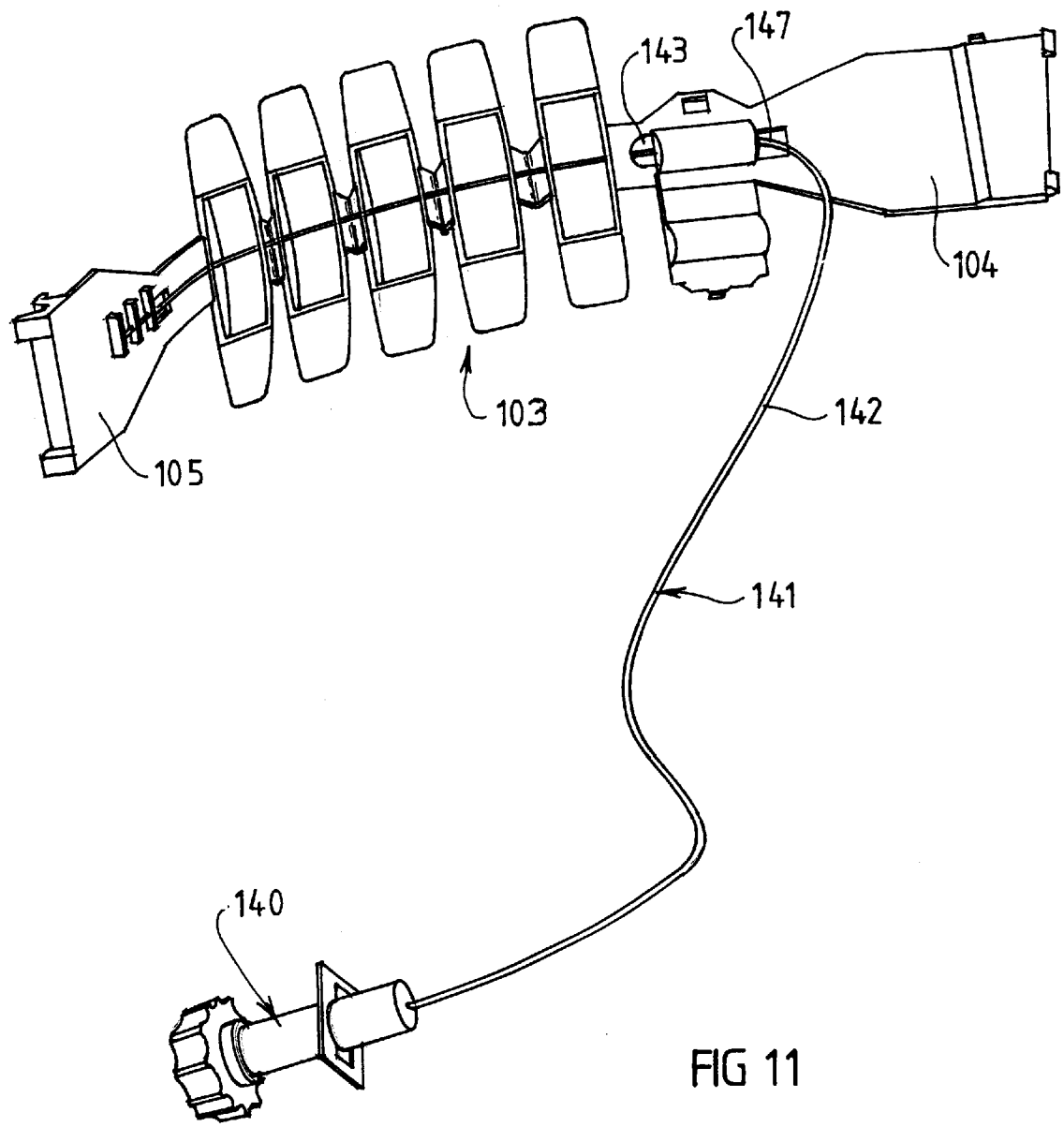
FIG. 11 is a rear perspective view of the lumbar support of FIG. 10.

FIGS. 10 and 11 relate to another embodiment of the invention which is a variation of the arrangements shown by FIGS. 1 and 2 and FIGS. 3 to 6 respectively. Parts of the FIGS. 10 and 11 embodiment which correspond to parts of the previously described embodiments will be given like reference numerals except that they will be in the number series 100 to 199.

The particular construction shown by FIGS. 10 and 11 does not have separate strap and shield members as do the previously described embodiments. Instead, the band 103 of FIGS. 10 and 11 includes a section 113 having a series of relatively rigid elements 114, and a strap portion 110 extends on each side of the section 113 and may be formed integral with that section. The elements 114 may be similar in form and arrangement to the ribs 14 of the FIGS. 1 and 2 embodiment. That is, each element 114 is preferably hollow and is preferably elongate in a direction transverse to the longitudinal axis of the band 103. The front outer surfaces 119 of the elements 114 combine to form the load bearing surface of the band 103.

Figure 12:
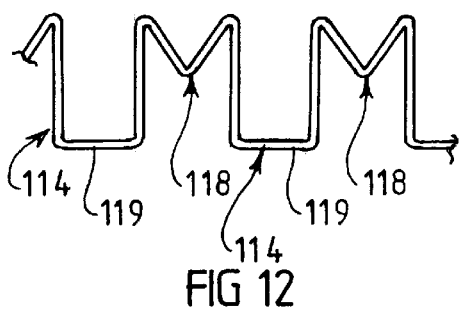
FIG. 12 is a diagrammatic illustration of part of the support band of the embodiment shwon by FIGS. 10 and 11.
Figure 13:
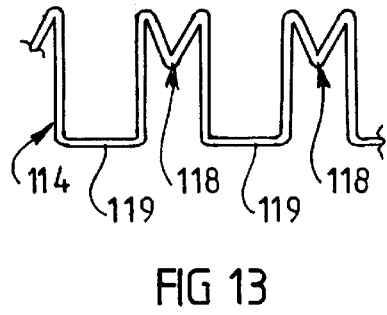
FIG. 13 is a view similar to FIG. 12 but showing the band in a condition of reduced length.
Figure 14:
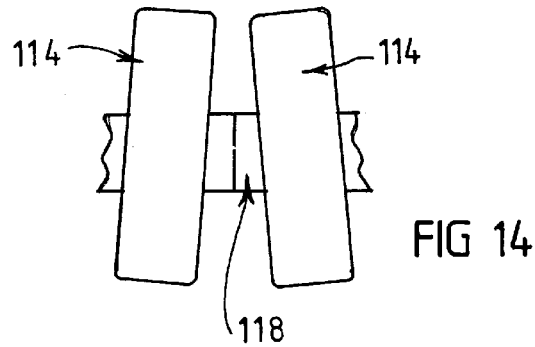
FIG. 14 is a diagrammatic illustration of one form of relationship which can be adopted parts of the lumbar support according to FIGS. 10 and 11.

Each element 114 is connected to the or each adjacent element 114 through at least one fold or pleat 118 which permits the interconnected elements 114 to move towards and away from one another as shown diagrammatically by FIGS. 12 and 13. The pleats 118 also allow lateral tilting of the elements 114 so that the spacing between adjacent elements 114 can vary in the longitudinal direction of those elements as shown diagrammatically by FIG. 14.

The ends 104 and 105 of the band 103 may be connected to a seat backrest in any suitable manner, such as by clips 108 similar to those referred to in connection with the previously described embodiments.

Manually operable drive means 140 is shown connected to the band 103 in FIGS. 10 and 11, but power operated drive means could be used if desired.

In the particular arrangement shown by FIGS. 10 and 11 the drive means 140 is connected to the bands 103 through a flexible cable 141 having a tubular cover 142 and a wire core 143 slidable axially within that cover. The cover 142 extends between the drive means 140 and the strap portion 110 adjacent the band end 104, and the core 143 extends between the drive means 140 and the other strap portion 110. A section 144 of the core 143 projects beyond an end of the cover 142 and extends across the back of the band 103 as best seen in FIG. 11. The core section 144 may be retained in close association with the band section 113 by one or more clips, but any suitable means could be used for that purpose.

Figure 15:
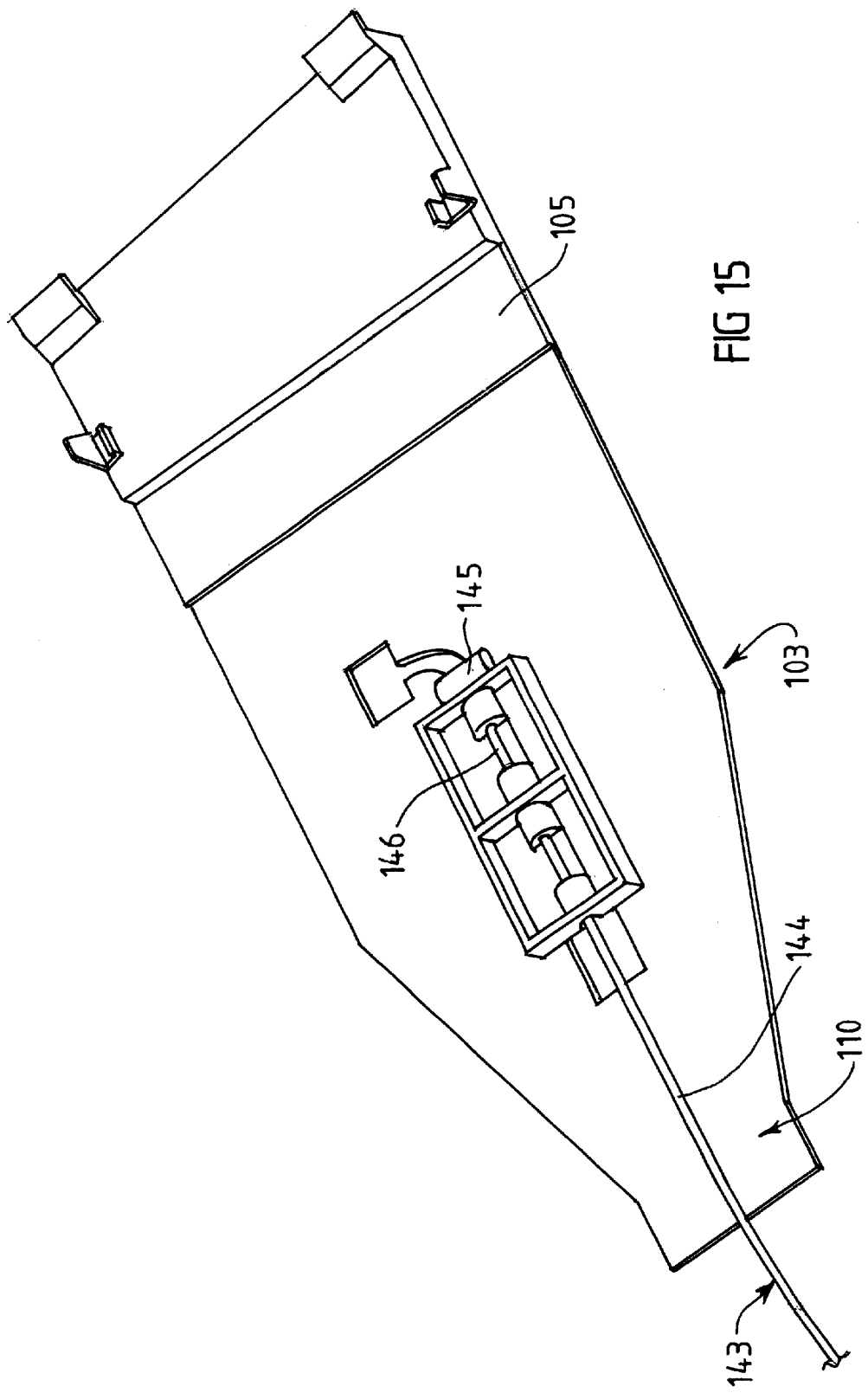
FIG. 15 is a perspective view of one end of the lumbar support band of FIGS. 10 and 11.

A trunnion 145 attached to the terminal end 146 of the cable core 143 may be connected to the band 103 as shown by FIG. 15 so as to be held against movement towards the band end 104. Other types of connection could be adopted for that purpose. The end 147 of the cable cover 142 is connected to the band 103 so as to be held against movement towards the band end 105, and any suitable arrangement could be adopted for that purpose. The arrangement is such that the spacing between adjacent elements 114 is varied by changing the length of the core section 144 exposed beyond the cover end 147.

The drive means 140 can be of any suitable form so as to be operable to either reduce the length of the core section 144 by drawing the core 143 into the cover 142, or increase the length of the core section 144 by allowing a greater part of the core 143 to extend out of the cover 142. When the length of the core section 144 is reduced, adjacent band elements 114 are pulled towards one another, and that relative movement is permitted by lateral collapse of the interconnecting pleats 118 (compare FIGS. 12 and 13). When the length of the core section 144 is increased, the band elements 114 are able to move further apart, and that movement is accompanied by lateral spreading of the pleats 118.

Figure 21:
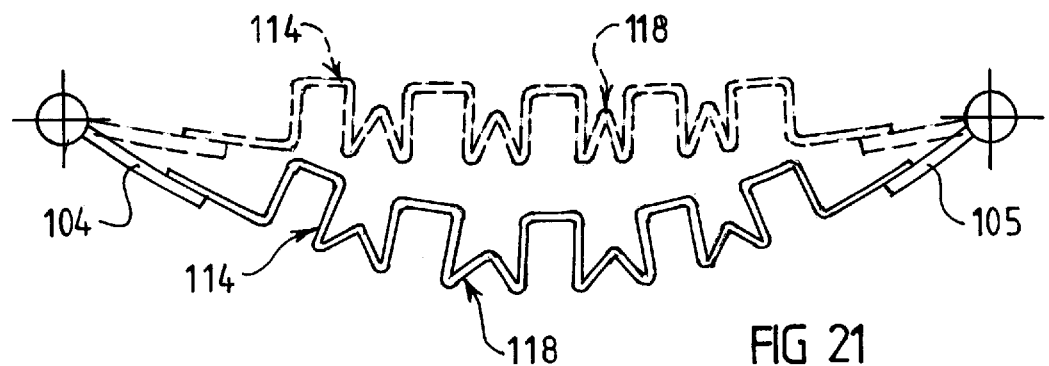
FIG. 21 is a diagrammatic illustration of the consequences of one type of adjustment made to the embodiment of FIGS. 17 and 18.

It will be evident from the foregoing that relatively little effort is required to cause lengthwise adjustment of the band section 113 and to thereby cause adjustment of the extent to which the band 103 curves rearwardly. FIG. 21 illustrates the variation in that rearward curvature.

The core section 144 functions as a force transmitting element for the purpose of the foregoing adjustment, but it also has another function. The core section 144 reinforces the structure of the band 103 so that it can withstand the load applied between its ends by an occupant of the associated seat. Such a load will of course increase the longitudinal tension in the band 103 and will therefore tend to cause lateral spreading of the pleats 118, but such spreading is prevented by the influence of the relatively strong core section 144. That is, the core section 144 enables a particular band curvature to be selected through operation of the drive means 140, and also functions to retain the band 103 at the selected curvature.

Figure 16:
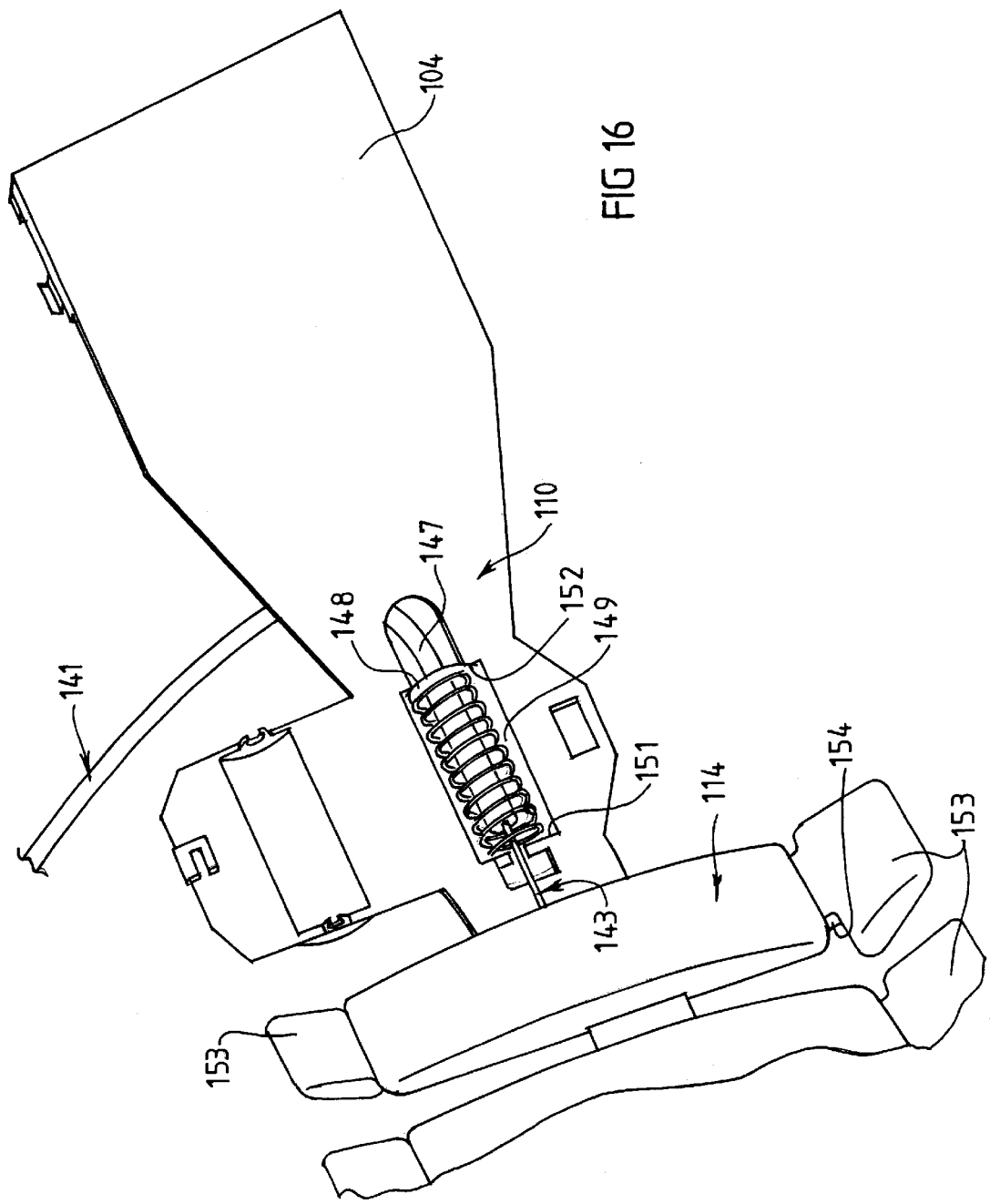
FIG. 16 is a perspective view of the other end of the lumbar support band of FIGS. 10 and 11.

FIG. 16 shows one particular form of connection between the cable cover end 147 and the band 103. The cover end 147 abuts against a plunger 148 which is mounted in a groove 149 of the strap portion 110 so as to be capable of limited movement towards and away from the band end 105. A coil compression spring 150 acts between the plunger 148 and the end 151 of the groove 149 so as to normally hold the plunger 148 at the opposite end 152 of the groove 149. In the event of a sudden load being applied to the lumbar support the spring 150 will compress to allow some movement of the cover end 147 towards the band end 105. Thus, the effective length of the band 103 is temporarily extended by compression of the spring 150 thereby aiding the comfort of a person occupying the associated seat.

A modified form of element 114 is also shown by FIG. 16. An extension piece 153 is provided at each end of each element 114 and is connected to the main body of the element 114 and is connected to the main body of the element 114 by means of a flexible hinge 154. The hinge 154 is preferably integral with both the body of the element 114 and the extension piece 153. The arrangement is such that the extension piece 153 is biased to tilt forward relative to the remainder of the element 114 as shown by FIG. 16. Each extension piece 153 is able to swing rearwards through a limited distance relative to the main body of the associated element 114 and thereby reduces the effort necessary to tilt the relevant end of the element 114 forwards during adjustment of the lumbar support. That is particularly useful during tilt adjustment as hereinafter described.

It will be apparent that power operated drive means could be substituted for the manual drive means 140 in the embodiment of FIGS. 10 and 11. Such power operated drive means could be constructed and arranged substantially in the same manner as the drive means 24 of the previously described embodiments, and may involve use of a cable drive connection of the kind described in connection with FIGS. 10 and 11, or of the kind hereinafter described in connection with FIGS. 17 and 18.

Figure 17:
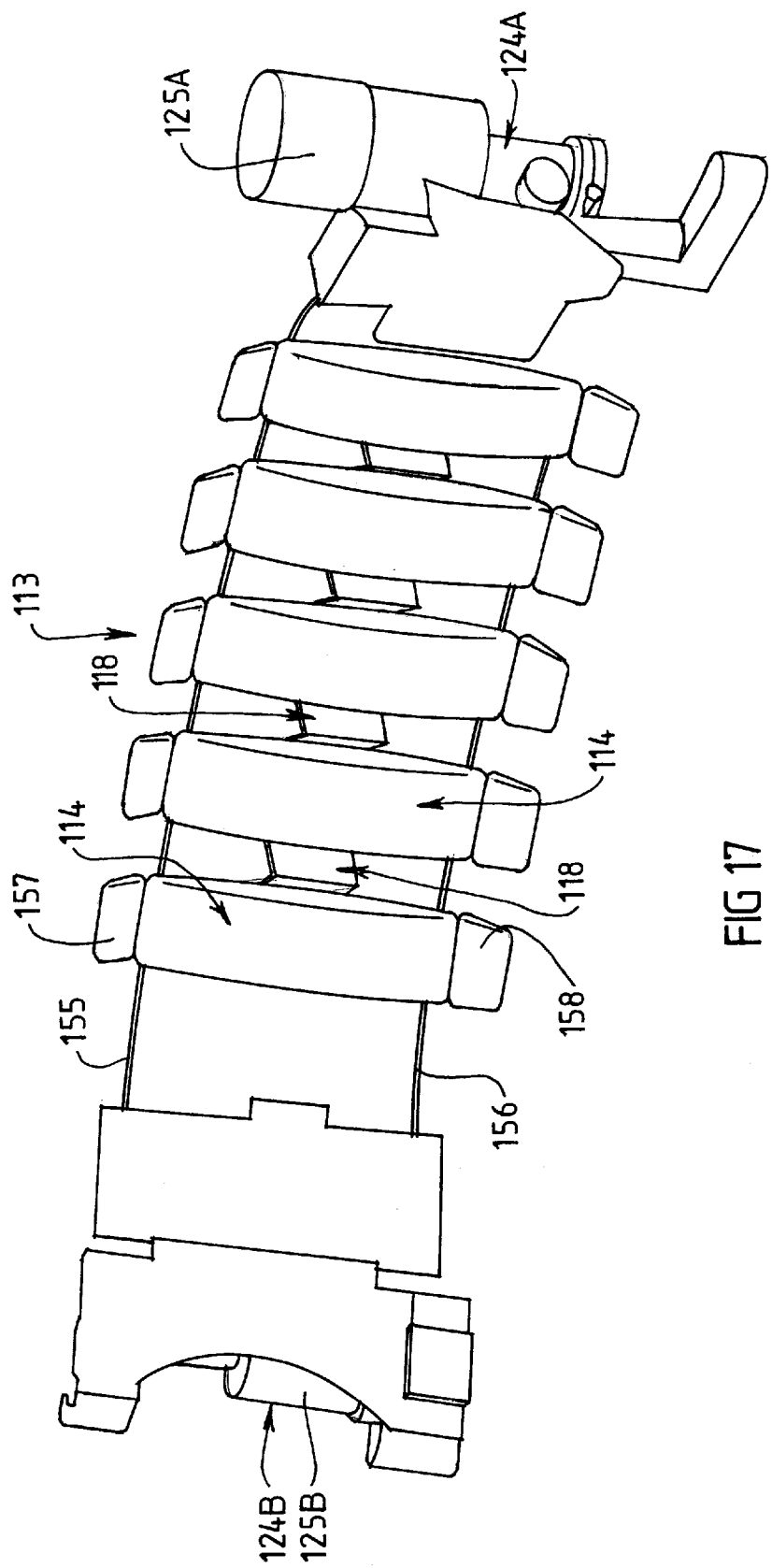
FIG. 17 is a front perspective view of yet another embodiment of the invention.
Figure 18:
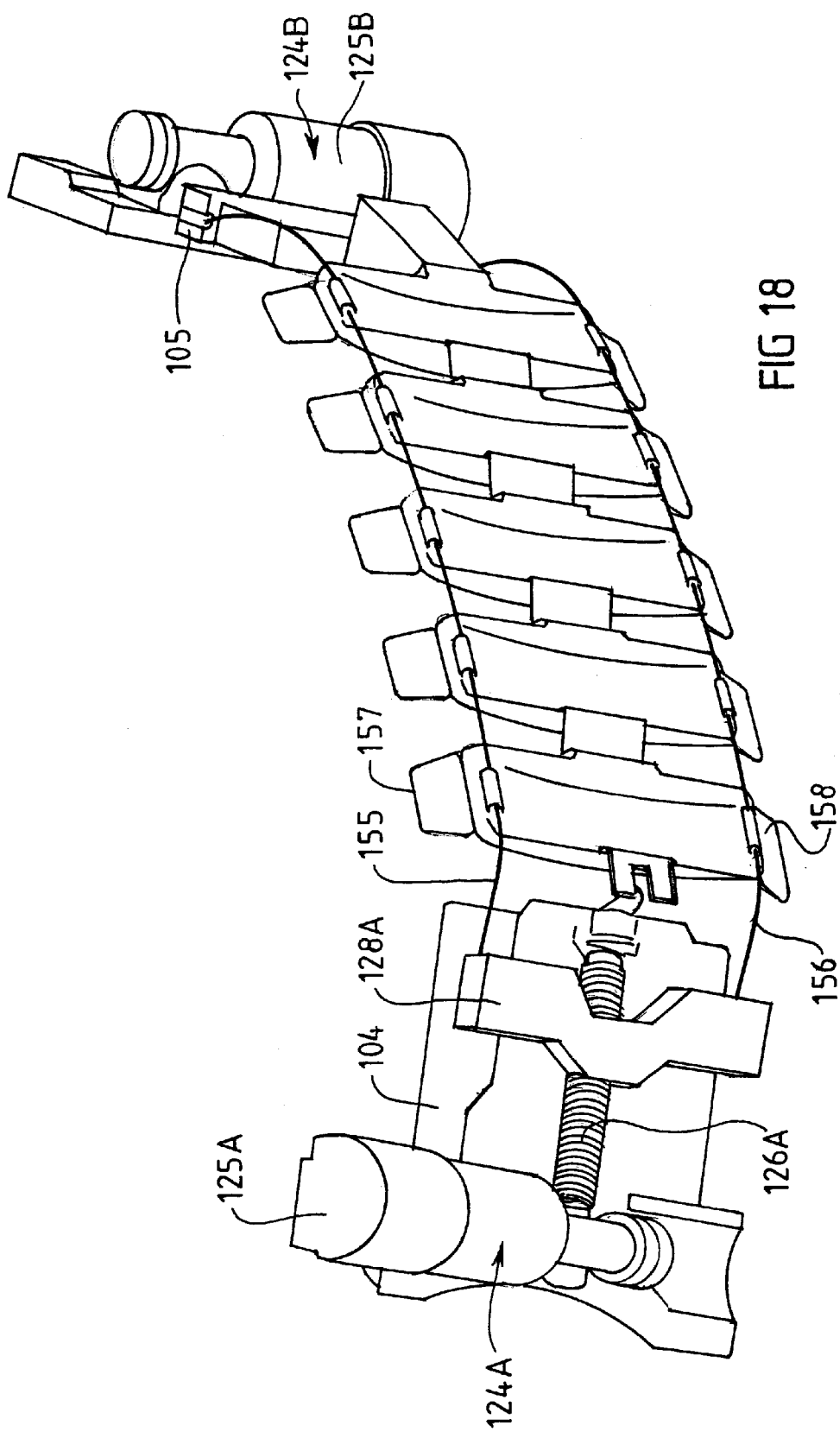
FIG. 18 is a rear perspective view of the embodiment shown by FIG. 17.

FIGS. 17 and 18 show another embodiment of the invention which utilizes elements 114 and interconnecting pleats 118 similar to those described in connection with FIGS. 10 and 11. Electrically powered drive means 124 similar to the drive means 24 of the previously described embodiments is utilizes in the particular arrangement shown by FIGS. 17 and 18, and the drive means 124 is connected to the band 103 in such a way that two different types of adjustment can be effected. One adjustment changes the rearward curvature of the band 103 and is generally referred to as fore and aft adjustment. The other adjustment is referred to as tilt adjustment and causes the elements 114 to swing about an axis extending generally in the longitudinal direction of the band 103 so that either the upper end or the lower end of each element 114 moves forwards relative to the opposite end.

It also needs to be noted that two separate drive means 124 are adopted in the embodiment of FIGS. 17 and 18, and each is connected to a respective opposite end 104 and 105 of the band 103. For convenience of description the drive means 124 at the end 104 will be identified by the reference numeral 124A, and the other drive means will be identified by the reference numeral 124B. It will also be convenient to distinguish between like components of the two drive means by use of the A and B references.

Each end 104 and 105 of the band 103 forms mounting means whereby the band 103 is attachable to a seat backrest. If clips 108 as previously described are utilizes, they will form part of the mounting means.

In the particular arrangement shown each drive means 124 has a housing part 123 which is connected to or forms part of a respective one of the band ends 104 and 105. The threaded spindle 126 of each drive means 124 cooperates with the carriage 128 as in the previously described embodiments so as to drive that carriage in the longitudinal direction of the band 103. Movement of the carriages 128 along their respective spindles 126 influences the condition of the band 103 through two flexible cables 155 and 156 which extend between and are connected to the two carriages 128. Each cable 155 and 156 is located on a respective opposite side of the longitudinal axis of the band 103 so as to act on each element 114 adjacent upper and lower ends 157 and 158 respectively of those elements. The arrangement is such that operation of the drive means 124A causes fore and aft adjustment of the band 103, and operation of the drive ends 124B causes tilt adjustment as previously described. That difference in effect can be achieved in a variety of ways, and one particularly satisfactory and presently preferred mechanism is shown by FIGS. 17 to 20.

Figure 19:
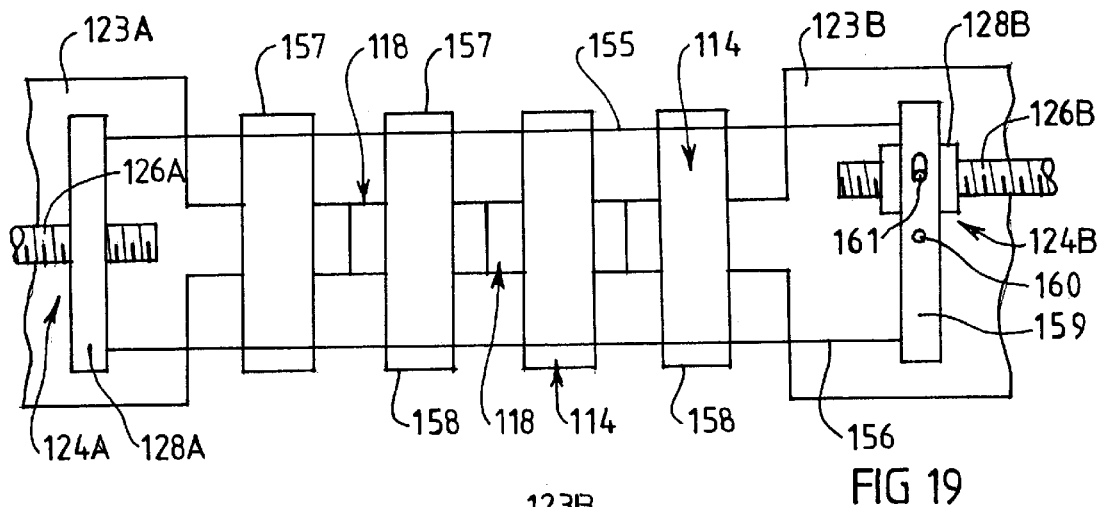
FIG. 19 is a diagrammatic front view of the embodiment shown by FIGS. 17 and 18.

It is preferred, as shown by FIG. 19, that the cables 155 and 156 are connected to the carriage 128B through a pivoted lever 159. In the arrangement shown, the lever 159 is connected to the housing 123B through a pivot mounting 160 which is preferably aligned with the axis of the spindle 126A. As also shown diagrammatically by FIG. 19, the spindle 126B is laterally offset from the spindle 126A, and the lever 159 is connected to the carriage 128B through a pivotal mounting 161. It is further preferred that both the pivot mounting 161 and the axis of the spindle 126B are positioned substantially mid-way between the pivot mounting 160 and the cable 155. Also, the pivot mounting 161 is preferably arranged to permit variation in the spacing between the axes of the two mountings 160 and 161 (see FIGS. 19 and 20).

When the drive means 124A is operated, the carriage 128A moves along the spindle 126A, but unlike the lever 159 the carriage 126A is unable to swing relative to that spindle. Any suitable guide means, such as the guide means shown by FIG. 7, can be used to retain a substantially right angled relationship between the carriage 128A and the spindle 126A. Movement of the carriage 128A therefore produces the same change in effective length at both the upper and the lower longitudinal edges of the band 103.

The drive means 124A therefore causes fore and aft adjustment of the band 103 and thereby produces a result of the kind diagrammatically illustrated by FIG. 21 and which was previously described in connection with FIGS. 10 and 11. When the carriage 128A is located towards the right hand end of the spindle 126A as shown in FIG. 19, both cables 155 and 156 will be relaxed and the band 103 will be able to curve relatively deeply rearwards as shown by the unbroken lines in FIG. 21. When the carriage 128A is located towards the left hand end of the spindle 126A, both cables 155 and 156 are tensioned and thereby reduce the rearward curvature in the band 103 as shown by the broken line in FIG. 21. The pleats 118 expand or collapse laterally according to the direction of adjustment of the band 103 and thereby reduce the effort necessary to move from one condition of adjustment to another.

It will be evident from the foregoing that operation of the drive means 124A has substantially the same effect as does operation of the drive means 140 in the embodiment of FIGS. 10 and 11. Also, the cables 155 and 156 serve to reinforce the band 103 in the same manner as the core section 144 of the FIGS. 10 and 11 embodiment reinforces the band 103.

Figure 20:
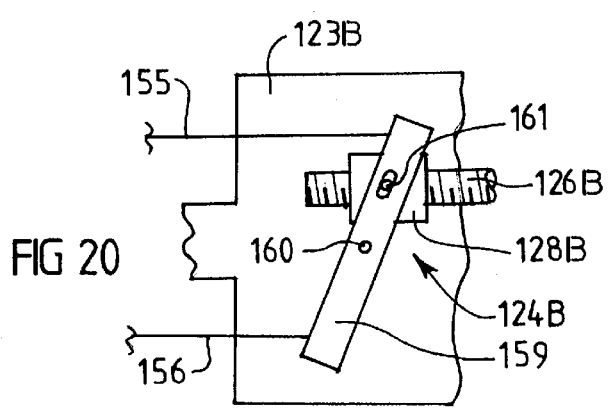
FIG. 20 is a diagrammatic view of a change which occurs at one end of the FIG. 19 arrangement as a consequence of adjustment of the lumbar support.

When the drive motor 124B is operated, the carriage 128B is caused to move along the spindle 126B as indicated by a comparison of FIGS. 19 and 20. Because of the interaction between the carriage 128B and the lever 159 through the mounting 161, that movement of the carriage 128B causes the lever 159 to swing about the pivot mounting 160. FIG. 20 shows the lever 159 swung in one direction, and reverse operation of the motor 124B will cause it to swing in the opposite direction.

Figure 22:
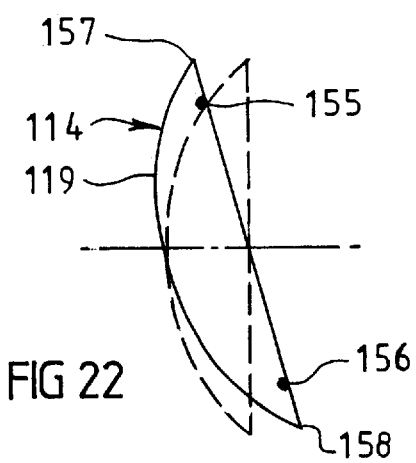
FIG. 22 is a diagrammatic side elevation of part of the embodiment of FIGS. 17 and 18 showing the consequences of another type of adjustment.

In the case of the adjustment shown by FIG. 20, the tension in the cable 155 is increased whereas the tension in the cable 156 is relaxed. The cable 155 therefore tends to flatten the band section 113—ie, reduce the rearward curvature—whereas the cable 156 tends to permit an increase in that curvature. It is therefore significant that the cables 155 and 156 act on each element 114 adjacent the upper and lower ends 157 and 158 respectively of the those elements. Because of that arrangement the different influence of each of the cables 155 and 156 causes each element 114 to tilt so that the upper end 157 moves forward relative to the lower end 158 as illustrated by FIG. 22.

Figure 23:
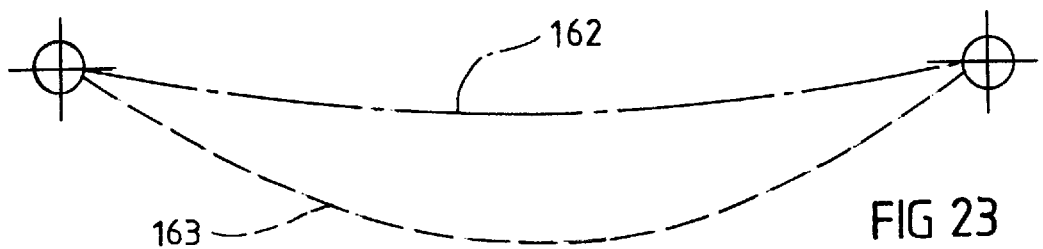
FIG. 23 is a diagrammatic plan view showing the results of the adjustment illustrated by FIG. 22.

FIG. 23 is a diagrammatic representation of the consequences of the foregoing tilt adjustment. The line 162 represents the rearward curvature of the band 103 along the upper longitudinal edge thereof, and is a line which passes through the upper ends 157 of the elements 114. The line 163 represents the rearward curvature of the band 103 along the lower longitudinal edge thereof, and is a line which passes through the lower ends 158 of the elements 114 It will be appreciated that a different upper and lower curve relationship will exist if the carriage 128B is moved in the direction opposite to that shown by FIG. 20.

The drive means 124A can be operated without disturbing the upper and lower curve relationship established by operation of the drive means 124B as described above. Operation of the drive means 124A will cause a change in the depth of the curvature at both the upper and lower edges of the band 103, but it will not cause a change in the relationship between those curvatures. That is, one curvature would remain relatively shallow and the other will remain relatively deep.

The drive means 124B could be omitted in a variation of the FIGS. 17 and 18 embodiment so that the only adjustment available is fore and aft adjustment. Such an arrangement would be essentially the same as the embodiment of FIGS. 10 and 11 except for the nature of the drive means and the use of two cables rather than one. Alternatively, that variation could employ a single cable, and in that event the cable would be preferably located substantially midway between the upper and lower ends 157 and 158 of the elements 114. In either type of variation, the end of the or each cable remote from the drive motor can be attached to the band end 105 in any suitable manner to permit the variation in tension as described above.

Each of the embodiments described is preferably arranged so that the lumbar support band and the associated drive means can be attached to or removed from a seat backrest as a single assembly.

The lumbar support band described has the advantage that it enables an effective variation of the support function of the band to be achieved with minimum effort. That advantage it achieved in a simple manner and without the need for significant increase in the number of components employed in a lumbar support system. An assembly including the drive means described has the advantage of being compact and easily attached to and removed from a seat frame.

Various alterations, modifications and/or additions may be introduced into the constructions and arrangements of parts previously described without departing from the spirit or ambit of the invention as defined by the appended claims.

What is claimed is:

1. A lumbar support for use with the backrest of a seat, said support including, an elongate band having a first end and a second end and a front load bearing surface located between said ends, each said end being connectable to a respective one of two sides of said backrest between which the band extends when in use, drive means connected to said band and being operable to vary longitudinal tension in the band, said load bearing surface having a rearward curvature between said ends at least when said longitudinal tension is relatively low, and a plurality of pleats located between said first and second ends, each said pleat forming part of said band and being responsive to variation in said longitudinal tension so as to fold or unfold and thereby vary said rearward curvature.

2. A lumbar support according to claim 1, wherein said band includes a strap member which extends between said first and second ends, and a shield member which overlies at least part of a front surface of said strap member and which includes said pleats.

3. A lumbar support according to claim 2, wherein each said pleat has a front surface, and said pleat front surfaces combine to form said load bearing surface of the band.

4. A lumbar support according to claim 2, wherein each said pleat has a width in the longitudinal direction of said band and a depth extending in the front to back direction of said shield member, and the width of each said pleat reduces in response to an increase in said tension and thereby increases said depth.

5. A lumbar support according to claim 4, wherein said strap member has a rearward curvature between said ends at least when said tension is relatively low and which reduces as said tension increases, and a change in the rearward curvature of said load bearing surface results from a combined influence of a change in said pleat depth and a change in the rearward curvature of said strap member.

6. A lumbar support according to claim 2, wherein said strap member and said shield member each has a first end adjacent said band first end and a second end adjacent said band second end, said second end of the shield member is connected to said strap member so as to be restrained against movement relative to the strap member in at least one direction generally parallel to the longitudinal axis of said band, and the first end of said strap member is able to move relative to the first end of said shield member either in said one direction or in a direction opposite thereto.

7. A lumbar support according to claim 6, wherein mounting means is provided at each said end of the band and is operable to connect the respective said band end to a respective said side of the backrest, said second end of the strap member is attached to the mounting means at said second end of the band, said drive means and said first end of the shield member are connected to the mounting means at said first end of the band, and said drive means is connected to said first end of the strap member so as to be operable to move said first end of the strap member relative to said first end mounting means.

8. A lumbar support according to claim 7, wherein said drive means includes an electric motor attached to said first end mounting means and a screw threaded spindle drivably connected to said motor so as to rotate in response to operation of the motor, said spindle has its rotational axis extending generally in the longitudinal direction of said band and transverse to the axis of said motor, and said spindle is connected to said strap member first end so said first end of the strap member moves relative to the adjacent said mounting means in response to said spindle rotation.

9. A lumbar support according to claim 1, wherein each said pleat has a width in the longitudinal direction of said band and a depth extending in the front to back direction of said support, and the width of each said pleat reduces in response to an increase in said tension and thereby increases said depth.

10. A lumbar support according to claim 1, wherein said band includes a plurality of relatively rigid elements which are spaced apart in the longitudinal direction of said band, and at least one said pleat is located between and interconnects each two adjacent said elements.

11. A lumbar support according to claim 10, wherein each said element has a front surface, and said element front surfaces combine to form said load bearing surface of the band.

12. A lumbar support according to claim 10, wherein each said element is an elongate member having its longitudinal axis extending transverse to the longitudinal axis of said band.

13. A lumbar support according to claim 12, wherein each said element is a hollow member having a front wall and two side walls connected to the front wall and spaced apart in the longitudinal direction of said band.

14. A lumbar support according to claim 13, wherein said front wall is curved in the direction of the longitudinal axis of the element so that said front surface of the element has a convex curvature, and said front wall curvature has a forward projection which is greatest intermediate ends of said element.

15. A lumbar support according to claim 12, wherein an extension piece is located at each end of each said element, each said extension piece extends beyond a respective adjacent end of the element and is hingedly connected to the respective adjacent end of the element for movement relative to the element about an axis extending generally in the longitudinal direction of said band.

16. A lumbar support according to claim 10, wherein mounting means is connected to each said band end and is operable to connect the respective said band end to a respective one of said backrest sides, and said elements are located between said mounting means.

17. A lumbar support according to claim 10, wherein said drive means includes a manually operable actuator and a drive connection which drivably connects the actuator to said band.

18. A lumbar support according to claim 17, wherein said drive connection includes a flexible cable having a tubular cover and a wire core slidable axially within said tubular cover, the opposite ends of said core are connected to said actuator and said band second end respectively, and the opposite ends of said cover are connected to said actuator and said band first end respectively.

19. A lumbar support according to claim 10, wherein said elements are arranged in a series which extends in the longitudinal direction of said band and is located substantially midway between said band ends, and said drive means is operable to reduce or extend the length of said series and thereby vary said rearward curvature.

20. A lumbar support according to claim 10, wherein said drive means includes an electric motor connected to said band first end, and a drive connection which is responsive to operation of said motor and which drivably connects said motor to said band second end.

21. A lumbar support according to claim 20, wherein said drive connection includes a rotatable screw threaded spindle having its rotational axis extending generally in the longitudinal direction of said band and transverse to the axis of said motor, means connecting said spindle to said motor so that said spindle rotates in response to operation of said motor, a carriage connected to said spindle so as to move relative to said band in the longitudinal direction thereof in response to rotation of said spindle, and at least one flexible cable having opposite ends thereof connected to said carriage and said band second end respectively.

22. A lumbar support according to claim 21, wherein part of said cable is located behind said elements, and the longitudinal axis of said cable part extends substantially parallel to the longitudinal axis of said band and is located substantially midway between ends of each said element.

23. A lumbar support according to claim 21, including two said flexible cables each of which is located on a respective opposite side of the longitudinal axis of said band and extends substantially parallel to said longitudinal axis of said band, and said cables are located behind said elements and adjacent to respective opposite ends of said elements.

24. A lumbar support according to claim 20, wherein said elements are arranged in a series which extends in the longitudinal direction of said band and is located substantially midway between said band ends, and said drive means is operable to reduce or extend the length of said series and thereby vary said rearward curvature.

25. A lumbar support according to claim 20, including a second said drive means having an electric motor which is connected to said band second end and a drive connection which is responsive to operation of said second drive means motor and which drivably connects that motor to said band first end.

26. A lumbar support according to claim 25, wherein each said drive connection includes a rotatable screw threaded spindle having its rotational axis extending generally in the longitudinal direction of said band and transverse to the axis of the respective said motor, means connecting said spindle to the respective said motor so that the spindle rotates in response to operation of that motor, a respective carriage connected to said spindle of each said drive connection so as to move relative to said band in the longitudinal direction thereof in response to rotation of the spindle, and at least one flexible cable having each of opposite ends of said at least one flexible cable connected to a respective one of said carriages.

27. A lumbar support according to claim 26, wherein said at least one flexible cable comprises two said cables, each opposite end of each said cable is connected to a respective one of said carriages, and each said cable is located on a respective opposite side of the longitudinal axis of said band and is laterally spaced from that axis.

28. A lumbar support according to claim 27, wherein a lever is attached to the carriage of said second drive means and each said cable is connected to the carriage of said second drive means by way of said lever, each said cable is connected to a respective one of two opposite end portions of said lever, said lever is connected by a pivotal connection to said band second end for movement about a pivotal axis extending in the front to back direction of said band, and said pivotal connection is located between said end portions.

29. A lumbar support according to claim 28, wherein said pivotal connection is located substantially midway between said cables, and said lever attachment to the carriage of said second drive means is located substantially midway between said pivotal connection and one of said cables.

30. A lumbar support according to claim 28, wherein said pivotal connection is substantially aligned with the rotational axis of the spindle of the first said drive means.

31. A seat including a lumbar support according to claim 1.

* * * * *